(12) United States Patent
Nicholson

(10) Patent No.: US 7,817,684 B2
(45) Date of Patent: Oct. 19, 2010

(54) PASSIVELY MODELOCKED FIGURE EIGHT FIBER LASER

(75) Inventor: Jeffrey W. Nicholson, Morristown, NJ (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 11/985,442

(22) Filed: Nov. 14, 2007

(65) Prior Publication Data
US 2008/0144676 A1 Jun. 19, 2008

Related U.S. Application Data

(60) Provisional application No. 60/859,319, filed on Nov. 16, 2006.

(51) Int. Cl.
*H01S 3/098* (2006.01)

(52) U.S. Cl. .......................................................... 372/18

(58) Field of Classification Search .................. 372/18, 372/6
See application file for complete search history.

(56) References Cited

U.S. PATENT DOCUMENTS

| | | | |
|---|---|---|---|
| 5,008,887 A | 4/1991 | Kafka et al. | |
| 5,050,183 A * | 9/1991 | Duling, III | 372/94 |
| 5,450,427 A * | 9/1995 | Fermann et al. | 372/10 |
| 5,513,194 A | 4/1996 | Tamura et al. | |
| 5,577,057 A | 11/1996 | Frisken | |
| 5,617,434 A * | 4/1997 | Tamura et al. | 372/6 |
| 5,734,665 A | 3/1998 | Jeon et al. | |
| 5,812,567 A | 9/1998 | Jeon et al. | |
| 5,923,686 A | 7/1999 | Fermann et al. | |
| 6,097,741 A | 8/2000 | Lin et al. | |
| 6,163,630 A * | 12/2000 | Evans | 385/11 |
| 6,298,074 B1 | 10/2001 | Jeon et al. | |
| 6,385,216 B1 | 5/2002 | Chang et al. | |
| 6,570,892 B1 * | 5/2003 | Lin et al. | 372/6 |
| 6,959,021 B2 | 10/2005 | Po et al. | |
| 2006/0245456 A1 * | 11/2006 | Lasri et al. | 372/18 |

FOREIGN PATENT DOCUMENTS

WO WO 98/40939 9/1998
WO WO 9840939 A1 * 9/1998

OTHER PUBLICATIONS

Taverner, "Polarisation Maintaining Figure-8 Laser", Optoelectronics Research Centre, 1993.

* cited by examiner

*Primary Examiner*—Minsun Harvey
*Assistant Examiner*—Patrick Stafford

(57) ABSTRACT

A passively mode-locked, figure-eight laser is formed of all normal dispersion fiber, eliminating the need for using anomalous dispersion fiber. The fiber is selected to be polarization maintaining, with the remaining components of the laser (couplers, isolator, gain fiber) also formed as polarization maintaining elements. In one embodiment, a section of Yb-doped fiber is used as the gain element. An external modulation component (amplitude or phase) is preferably used to initiate the passive mode locking.

18 Claims, 4 Drawing Sheets

PASSIVELY MODELOCKED FIGURE EIGHT FIBER LASER

CROSS-REFERENCE TO RELATED APPLICATION

This application claims the benefit of U.S. Provisional Application No. 60/859,319, filed Nov. 16, 2006.

TECHNICAL FIELD

The present invention relates to a passively mode-locked fiber laser and, more particularly, to a figure eight mode-locked fiber laser of normal dispersion, polarization maintaining fiber.

BACKGROUND OF THE INVENTION

Ultra short optical pulses can be used in a number of applications including optical information processing and data communication, optical probing with high temporal resolution, laser surgery, and material processing. In particular, recent advances in optical data communication with data rates up to 2.5 Gbit/s or higher demand compact, ultra fast light sources with low maintenance, high reliability, and low cost.

Fiber lasers have been developed as a new generation of compact, inexpensive and robust light sources. In essence, a fiber laser is an optically-pumped resonator with a section of doped-fiber as the gain medium. As the gain exceeds the total optical loss in the resonator, a laser oscillation can be generated. Many different dopants can be used to achieve laser oscillations at different wavelengths. Atomic transitions in rare-earth ions can be used to produce lasers from visible wavelengths to far infrared wavelengths (e.g., 0.45 μm-3.5 μm). Erbium-doped fiber lasers for producing optical pulses at 1.55 μm are particularly useful for optical fiber communication since the optical loss in commonly used silica fibers is minimum at about 1.55 μm.

Mode-locked fiber lasers can use various cavity configurations such as linear, ring, and figure-eight geometries. See, for example, U.S. Pat. No. 5,008,887 issued to Kafka et al. on Apr. 16, 1991 and U.S. Pat. No. 5,513,194 issued to Tamura et al. on Apr. 30, 1996. However constructed, a mode-locked fiber laser is configured to have multiple longitudinal modes that simultaneously oscillate. A mode-locking mechanism is implemented in the resonator to synchronize the phases of different modes in such a way that the phase difference between any two adjacent modes is a constant. These phase-locked modes constructively add to one another to produce a short pulse.

Two common mode-locking schemes are "active" mode locking and "passive" mode locking. Active mode locking modulates either the amplitude or the phase of the intra-cavity optical field at a frequency equal to one or a multiplicity of the mode spacing. Active mode locking can be implemented by using intra-cavity electro-optic and acousto-optic modulators.

Alternatively, passive mode locking uses at least one nonlinear optical element inside the resonator to produce an intensity-dependent response to an optical pulse so that the pulse width of the optical pulse exiting the nonlinear element is reduced. Compared to the active mode locking, passive mode locking can be used advantageously to produce ultra short light sources. Commonly-used passive mode locking techniques include saturable absorbers, figure-eight lasers and intensity-dependent nonlinear polarization rotation.

Mode-locked fiber lasers typically require a balance of "normal" (i.e., negative) and "anomalous" (i.e., positive) dispersion fibers to achieve ultra-short pulses. For lasers at short wavelengths, such as Yb fiber lasers, this requirement poses a problem. Anomalous dispersion at short wavelengths requires specialty fibers, such as bandgap fibers or photonic crystal fibers. Both of these are difficult to manufacture, problematic in splicing to conventional fiber, and further require higher order mode (e.g., $LP_{02}$) propagation and appropriate mode converters at either end of the anomalous dispersion fiber.

Further, environmental stability for these sources requires that polarization maintaining fiber be used in most applications. However, the initiation of mode locking can be difficult in such laser cavities.

A need remains, therefore, for a mode-locked figure-eight fiber laser that does not require the use of anomalous dispersion material to provide the dispersion management necessary to produce mode-locked output pulses, as well as a capability of initiating mode locking in such a laser.

SUMMARY OF THE INVENTION

The limitations of the prior art are addressed by the present invention, which relates to a passively mode-locked fiber laser and, more particularly, to a figure eight mode-locked fiber laser of normal dispersion, polarization maintaining fiber.

In accordance with the present invention, a figure-eight, mode-locked fiber laser of the present invention comprises a two loops of polarization-maintaining single mode fiber, with a section of rare-earth-doped polarization maintaining fiber disposed along one of the loops to initiate amplification. A directional coupler is disposed between the first and second loops to control the propagation of an optical signal between the two loops. Inasmuch as each of the components is formed of polarization maintaining fiber, the polarization state of the propagating signal will not drift, and mode locking will remain fixed.

It has been found that when polarization maintaining fiber is used, a figure-eight laser will not easily be "self-starting". Therefore, in accordance with the present invention, a modulating signal source (either phase modulating or amplitude modulating) is coupled to one of the two loops to initiate the process. Once stimulated, the fiber laser will thereafter remain "passively" mode locked and the initial modulator source can be disconnected. A single polarization, polarization-maintaining isolator is included and performs the dual tasks of providing unidirectional operation in the non-amplifying loop (first loop), as well as adding strong polarization-dependent loss to the cavity, providing operation on a single polarization state.

Other and further aspects and features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
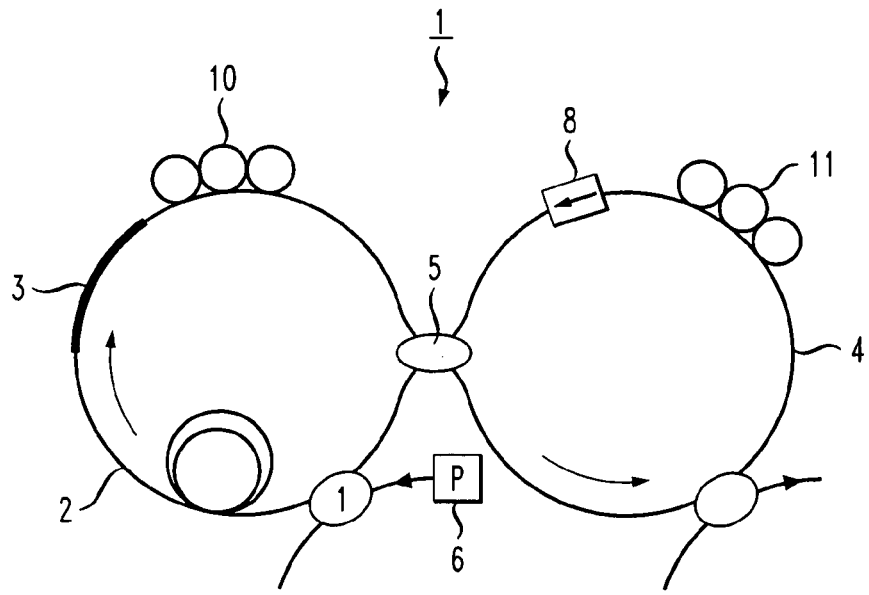
FIG. 1 shows the basic arrangement of a prior art, mode-locked figure-eight laser.

Prior to describing the configuration and operation of the inventive mode-locked figure-eight fiber laser, a basic figure-eight prior art fiber laser will be described. Referring to FIG. 1, a prior art figure-eight fiber laser 1 includes a first fiber loop 2 including a section 3 of doped fiber to provide amplification. Conventional forms of doped fiber section 3 will exhibit normal (negative) dispersion. Typically, the length of doped fiber section 3 is selected based on the desired center operating wavelength of the laser. Erbium is one of the conventional rare-earth material choices for this type of fiber laser. First loop 2 is coupled to a second loop 4, of positive (anomalous) dispersion fiber, through a 50:50 directional coupler 5. The combination of loops 2 and 4 with coupler 5 thus forms the "figure-eight" structure. A source 6 of pump light is coupled into first loop 2 via a coupler 7 (which may comprise, in one case, a wavelength division multiplexing element) to provide the light input for the structure.

Thereafter, the light amplified within section 3 of first loop 2 will continue to circulate around loops 2 and 4, exhibiting an increase in gain with each round trip. An isolator 8 in loop 4 will prevent any counter-propagating signal from being established within second loop 4. An output directional coupler 9 is also included in second loop 4 and is used to out-couple a fraction of the mode-locked laser output signal. In most cases, this fraction will be on the order of 10% or so, allowing for the figure-eight structure to remain passively mode-locked and continue to provide an output signal. A pair of mechanical polarization controllers 10 and 111 are disposed within first loop 2 and second loop 4, respectively, and used to maintain a consistent polarization state for the propagating signal.

As mentioned above, the need for "positive" dispersion optical fiber at short wavelengths (generally below about 1200 nm), as used in second loop 4 of the prior art configuration, remains problematic, requiring a specially-designed fiber with significant operational limitations. Additionally, the need for mechanical polarization maintaining elements within the prior art type of mode-locked figure-eight fiber laser results in a relatively large, bulky arrangement that is susceptible to environmental changes.

Figure 2:
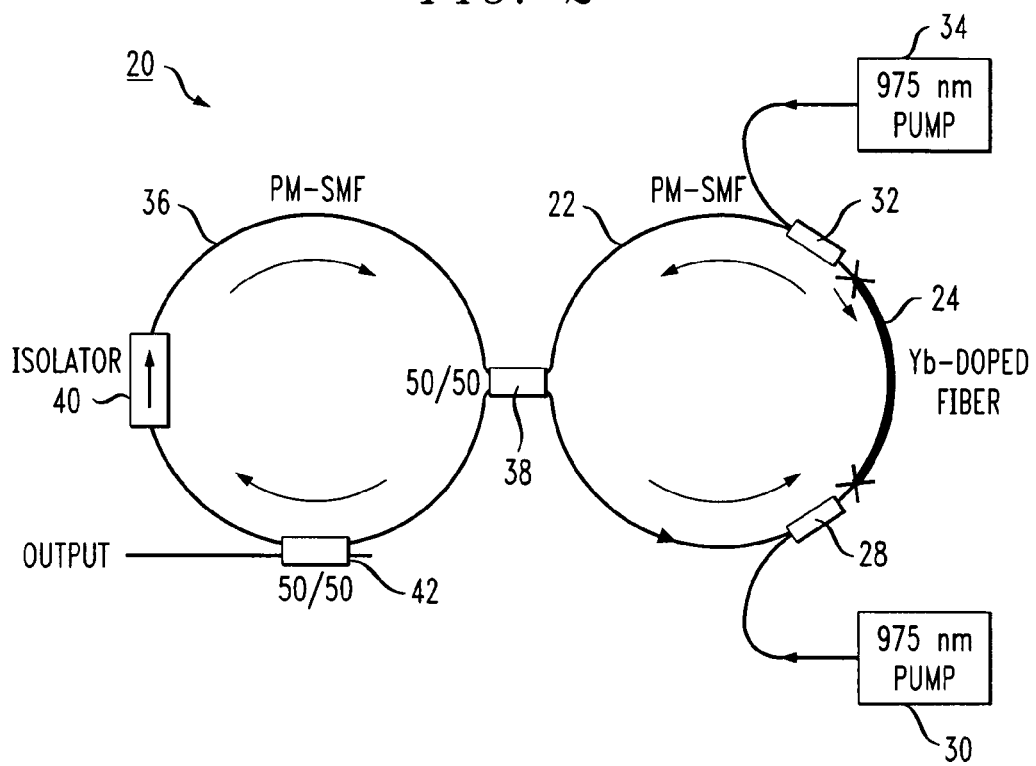
FIG. 2 illustrates a first embodiment of the present invention, comprising all normal dispersion, polarization maintaining fiber, utilized with a section of polarization maintaining, Yb-doped fiber to form a passively mode-locked, figure-eight laser formed in accordance with the present invention.

FIG. 2 illustrates an exemplary passively mode-locked figure-eight fiber laser 20 formed in accordance with the present invention. In accordance with the present invention, both "loops" of the figure-eight fiber laser are formed of normal (i.e., negative) dispersion fiber; there is no need to utilize specialty fibers to introduce positive dispersion in the structure of the present invention. Additionally, the need for mechanical polarization controllers has been eliminated by utilizing polarization maintaining fiber to form the loops. Further, it has been determined that for a passively mode-locked fiber to operate properly, an initial "boost" in modulation (either amplitude or phase) is required for the arrangement to enter the regime of passive mode locking. All of these aspects of the present invention are shown with particularity in the arrangement of FIG. 2.

Referring to the diagram, passively mode-locked, figure-eight fiber laser 20 comprises a first loop 22 of polarization maintaining, single mode fiber (PM-SMF). In accordance with the present invention, this fiber exhibits the "normal", negative dispersion characteristic of single mode fiber. A section of ytterbium-doped (Yb-doped), polarization maintaining fiber 24 is coupled to the PM-SMF to complete the geometry of first loop 22. The Yb dopant is used in this particular embodiment to provide output pulses at relatively short wavelengths (e.g., between 1010 and 1100 nm). A first input coupler 26 (also polarization maintaining) is used to inject a pump light signal from a pump source 28 into Yb-doped fiber 24. The wavelength of pump source 28, in this case illustrated as 975 nm, is selected to provide amplification utilizing the Yb dopant. A second, polarization maintaining, input coupler 32 is used to provide an additional, counter-propagating pump signal input to Yb-doped fiber 24.

Laser 20 further comprises a second loop 36, also formed of polarization maintaining, single mode fiber (again, of the "normal" negative dispersion). A polarization maintaining 50:50 optical splitter 38 is used to couple first loop 22 to second loop 36 and thus direct the propagating signal between the two loops. A polarization maintaining in-line optical isolator 40 is included within second loop 36 to prevent the counter-propagation of the signal through the system. A polarization maintaining output coupler 42 (here illustrated as a 50:50 splitter; any desired ratio may be used) is provided to out-couple the mode-locked pulse signal from fiber laser 20.

In operation, laser 20 is modelocked by first loop 22, which forms a nonlinear, amplifying loop mirror (NALM). In typical figure-eight lasers, as discussed above, mechanical polarizations controllers are used to align the state of polarization to a setting conducive to mode locking. Inasmuch as the arrangement of the present invention is completely formed of polarization maintaining elements, the need for additional, external polarization controllers has been eliminated.

Figure 3:
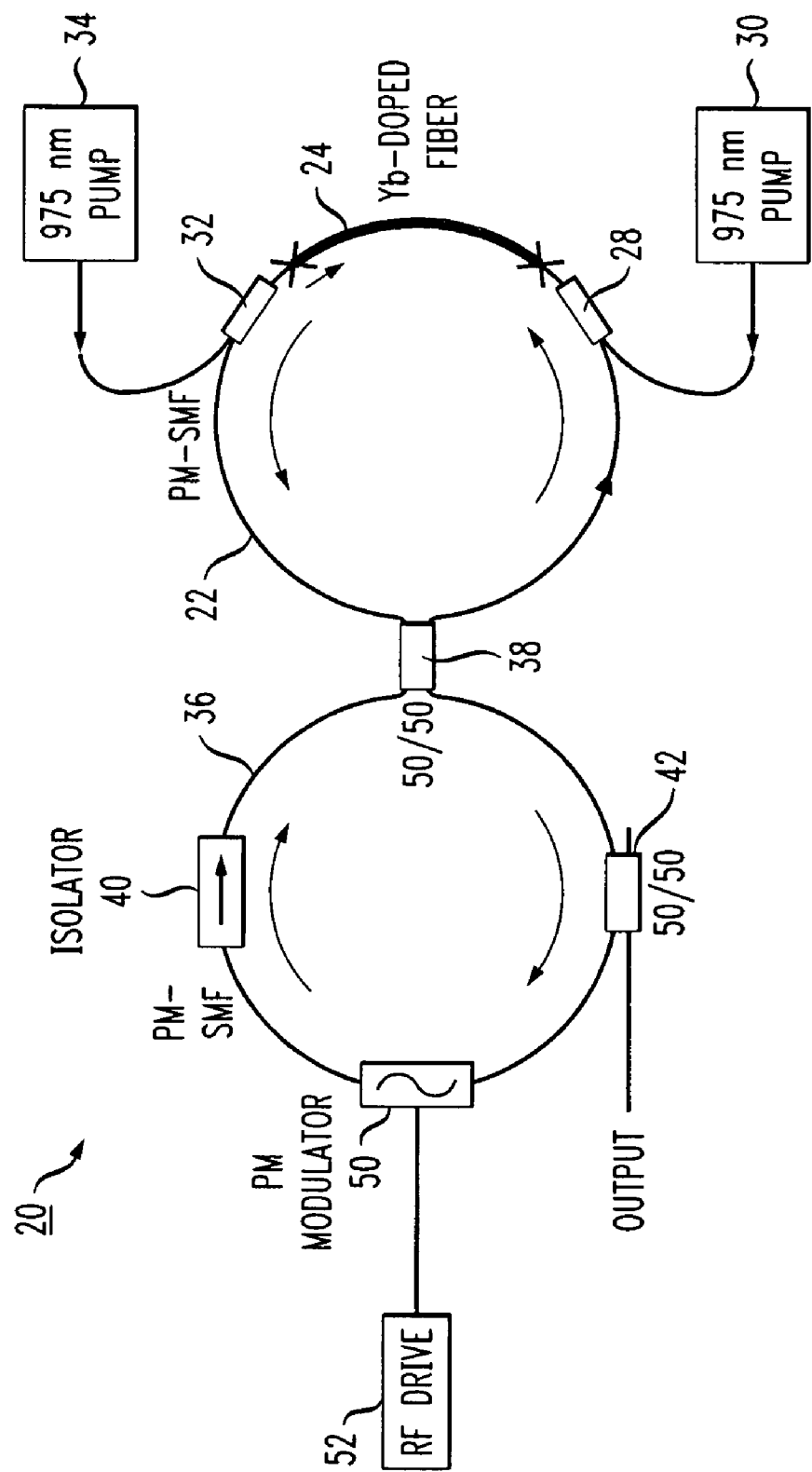
FIG. 3 illustrates an alternative embodiment of the present invention, including an additional modulation element to provide an initial perturbation signal to the figure-eight fiber laser and start the passive mode-locking state of the laser.

As mentioned above, achieving a self-starting configuration, such as shown in FIG. 2, can be difficult. FIG. 3 illustrates an alternative embodiment of the present invention, where an additional modulation element is used to perturb the steady-state condition of the laser sufficiently to initiate passive mode locking. As shown, laser 20 of the present invention is further configured to include a modulator element (polarization maintaining) 50 disposed along second loop 36. Modulator element 50 is driven by an external drive source 52 at the known repetition frequency of laser 20. The modulation may be either phase modulation or amplitude modulation, as long as the modulation is sufficient to perturb the steady-state condition of laser 20 and initiate mode locking. Once mode locking has been sustained, driver 52 is disconnected from the system and the passive mode-locking operation of figure-eight laser 20 continues only via the Kerr nonlinearity effect in the nonlinear, amplifying loop mirror 22.

In place of amplitude/phase modulation, other types of perturbations may be used to initiate passive mode locking.

For example, a mechanical perturbation may be used such as rapidly stretching and compressing the fiber. The fiber may also be bent to perturb the steady state and initiate passive mode locking. Acoustic perturbations may be used as well, such as an audio signal (kHz, for example) directed at the fiber, a piezo-electric transducer coupled to the fiber, and the like. In general, any method of introducing a perturbation to the steady state condition of the figure-eight arrangement may be used to initiate passive mode locking in accordance with the present invention.

At long wavelengths (e.g., greater than 1300 nm), fibers with both anomalous and normal dispersion are readily available. However, a polarization maintaining figure-eight laser utilized at a longer wavelength value will still require an external perturbation of some sort to initiate passive mode locking.

Figure 4:
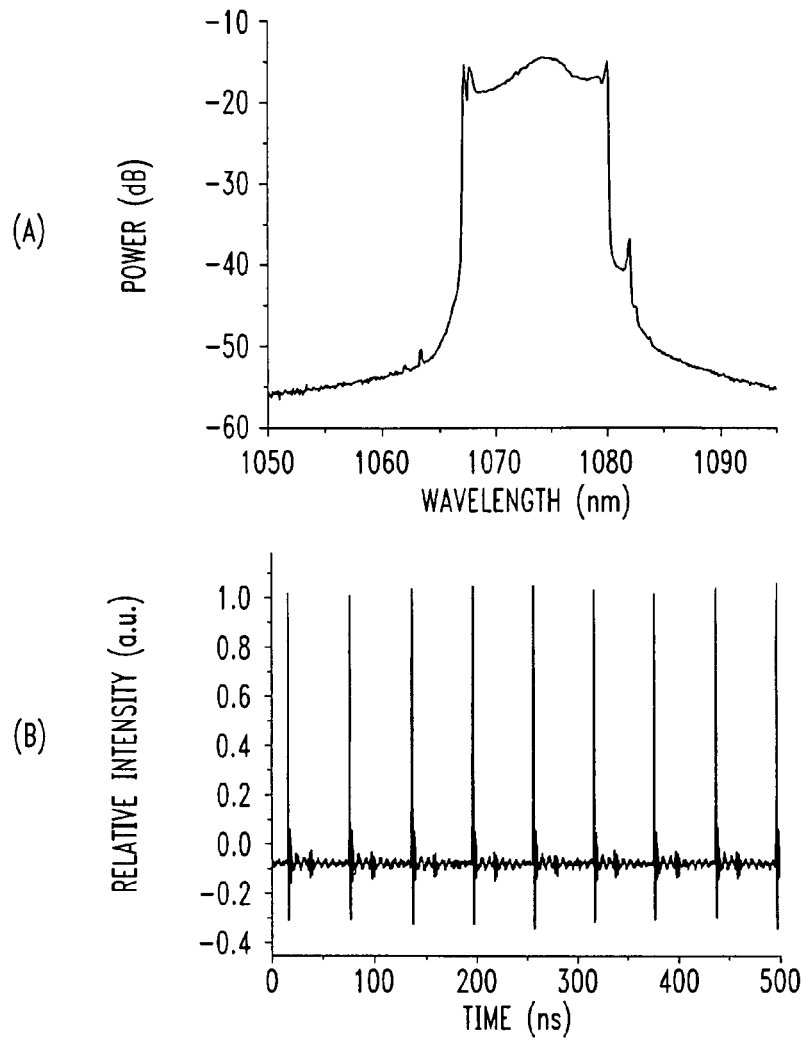
FIG. 4(a) shows a plot of the mode-locked spectrum of the polarization-maintaining, figure-eight fiber laser of the present invention.
FIG. 4(b) is a plot of the corresponding output pulse train generated by the fiber laser of the present invention.
Figure 5:
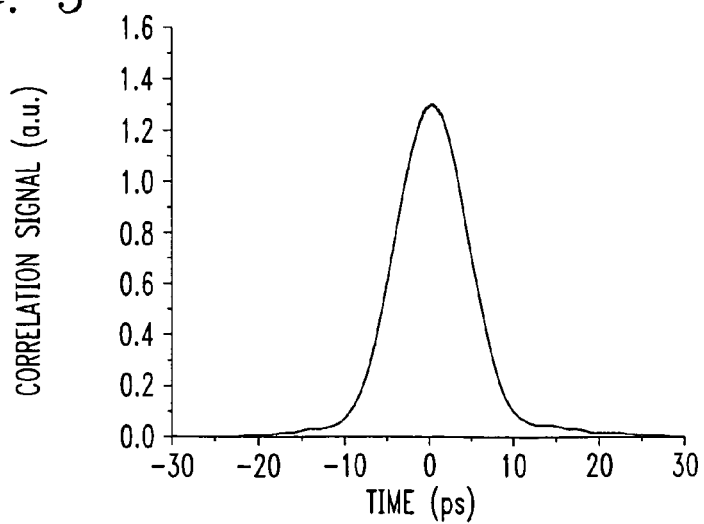
FIG. 5 is a plot of the autocorrelation of the pulses in FIG. 4(b)

FIG. 4(a) shows a plot of the mode-locked spectrum of the polarization-maintaining, figure-eight fiber laser of the present invention. In the particular arrangement utilized to generate this data, the total output power of the laser was approximately 50 mW, for a total pump power of 400 mW. FIG. 4(b) is a plot of the corresponding output pulse train generated by the fiber laser of the present invention. The repetition pulse frequency of this laser was approximately 33.1 MHz. FIG. 5 is a plot of the autocorrelation of the pulses in FIG. 4(b). As shown, the "clean" autocorrelation result is indicative of the excellent properties of the pulses: low noise, and highly stretched (compared to the bandwidth limit). If pulse compression is needed thereafter, a section of anomalous dispersion fiber may be spliced to the output of laser 20 to perform this task.

Figure 6:
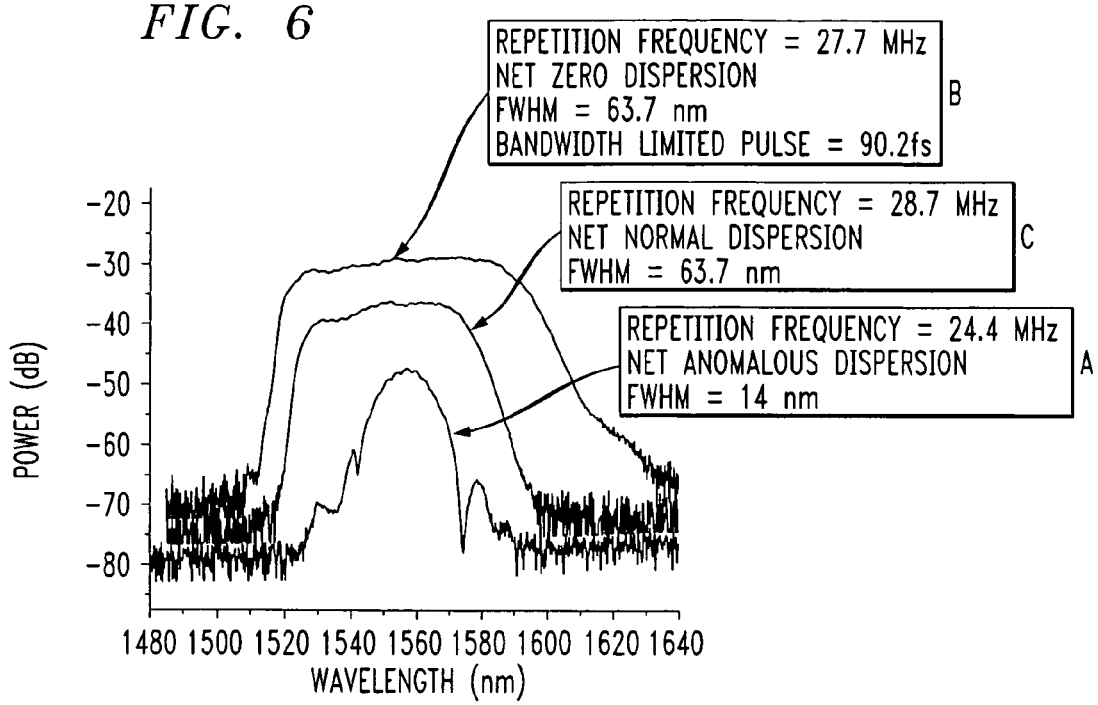
FIG. 6 illustrates the spectrum of a mode-locked fiber laser, comparing the prior art to the arrangement of the present invention.

FIG. 6 illustrates the spectrum of a mode-locked fiber laser, comparing the prior art to the arrangement of the present invention. Plot A is associated with a prior art mode-locked figure-eight laser, such as illustrated in FIG. 1. In this case, the presence of a long length of anomalous dispersion fiber results in the overall laser dispersion also being positive. Therefore, the laser operates as a soliton, having a FWHM value of 14 nm. As the amount of anomalous dispersion fiber is decreased, the overall laser cavity dispersion approaches zero, and the spectrum broadens as shown in plot B. Here, the FWHM value is 63.7 nm, with a bandwidth-limited pulse of 90.2 fs.

Figure 7:
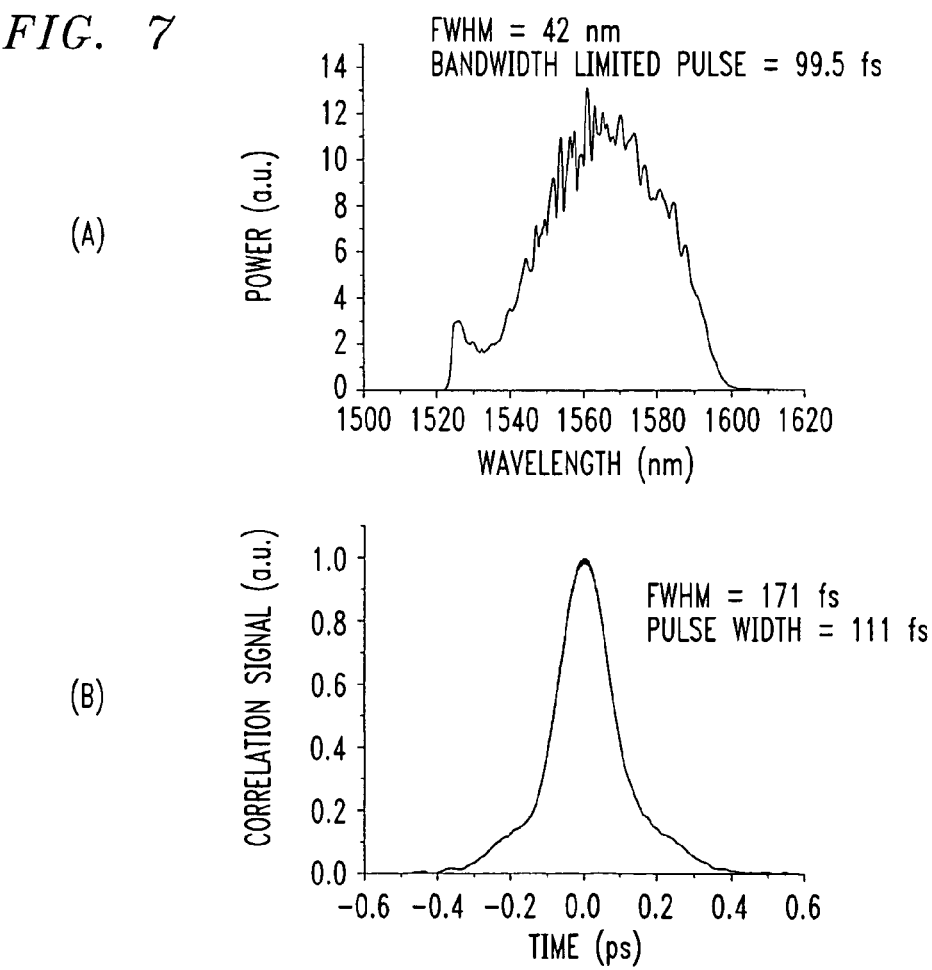
FIG. 7(a) shows the spectrum of a 111 fs pulse output from an exemplary passively mode-locked, polarization maintaining, figure-eight laser formed in accordance with the present invention.
FIG. 7(b) shows the autocorrelation function associated with the plot of FIG. 7(a).

FIG. 7(a) shows the spectrum of a 111 fs pulse output from an exemplary passively mode-locked, polarization maintaining, figure-eight laser formed in accordance with the present invention. FIG. 7(b) shows the associated autocorrelation function. The zero-phase Fourier transform of the spectrum shown in FIG. 7(a) corresponds to a 100 fs pulse. For this particular embodiment, phase/amplitude modulation (or any other type of external perturbation) will be required to start the pulsing. Once passive mode locking is achieved, the external modulation may be switched off and disconnected from the pulse source.

It will be apparent to those skilled in the art that various modifications and variations can be made to the present invention without departing from the spirit or scope thereof. Thus, it is intended that the present invention cover the modifications and variations of the above-described embodiments, all of which are considered to fall within the spirit and scope of the invention as defined by the claims defined hereinbelow.

What is claimed is:

1. A passively mode-locked, figure-eight fiber laser comprising:
   a first loop of polarization maintaining normal, negative dispersion single mode optical fiber, the first loop including a section of polarization maintaining doped fiber responsive to an incoming optical pump signal to generate an amplified version thereof, the first loop defined as a nonlinear amplifying loop mirror;
   a second loop of polarization maintaining normal, negative dispersion single mode fiber; and
   a polarization maintaining directional coupler disposed between and coupled to both the first and second loops of polarization maintaining normal, negative dispersion fiber, the maintained polarization state of a propagating optical signal providing mode-locking thereof.

2. A passively mode-locked, figure-eight fiber laser as defined in claim 1 wherein the laser further comprises a polarization maintaining optical isolator disposed one of the first and second loops to provide directional control of the propagating, mode-locked signal.

3. A passively mode-locked, figure-eight fiber laser as defined in claim 1 wherein the laser further comprises a polarization maintaining input coupler disposed within the first loop for directing an input optical pump signal into the section of polarization maintaining doped fiber.

4. A passively mode-locked, figure-eight fiber laser as defined in claim 3 wherein the polarization maintaining input coupler comprises a polarization maintaining wavelength division multiplexer.

5. A passively mode-locked, figure-eight fiber laser as defined in claim 1 wherein the laser further comprises a polarization maintaining output coupler disposed within the second loop for out-coupling a portion of the mode-locked optical pulses created therein.

6. A passively mode-locked, figure-eight fiber laser as defined in claim 1 wherein the laser further comprises
   an external perturbation source coupled to one of the first and second loops to introduce a perturbation into the propagating signal and initiate passive mode locking.

7. A passively mode-locked, figure-eight fiber laser as defined in claim 6 wherein the external perturbation source comprises a polarization maintaining modulation element for introducing a modulation perturbation to the propagating signal, and the laser further comprises an external driver coupled to the polarization maintaining modulation element for supplying an input modulation signal.

8. A passively mode-locked, figure-eight fiber laser as defined in claim 7 wherein the external driver comprises a switchable driver capable of being closed off when passive mode-locking is established.

9. A passively mode-locked, figure-eight fiber laser as defined in claim 7 wherein the polarization maintaining modulation element comprises a phase modulating element.

10. A passively mode-locked, figure-eight fiber laser as defined in claim 7 wherein the polarization maintaining modulation element comprises an amplitude modulating element.

11. A passively mode-locked, figure-eight fiber laser as defined in claim 6 wherein the external perturbation source comprises a mechanical perturbation element for modifying the mechanical properties of one of the first and second loops.

12. A passively mode-locked, figure-eight fiber laser as defined in claim 11 wherein the mechanical perturbation element functions to stretch and comprise the optical fiber.

13. A passively mode-locked, figure-eight fiber laser as defined in claim 6 wherein the external perturbation source comprises an acoustic perturbation element.

14. A passively mode-locked, figure-eight fiber laser as defined in claim 13 wherein the acoustic perturbation element comprises an audio signal operating in the kHz range.

15. A passively mode-locked, figure-eight fiber laser as defined in claim 1 wherein the polarization maintaining directional coupler comprises a 50:50 coupler.

16. A passively mode-locked, figure-eight fiber laser as defined in claim 1 wherein the doped fiber section comprises a Yb-doped section of optical fiber.

17. A passively mode-locked, figure-eight fiber laser as defined in claim 1 wherein the laser further comprises
   a positive, anomalous dispersion element coupled to the output of the laser to perform compression on the output pulses therefrom.

18. A passively mode-locked, figure-eight fiber laser comprising:
   a first loop of polarization maintaining normal, negative dispersion single mode optical fiber, the first loop including a section of polarization maintaining doped fiber responsive to an incoming optical pump signal to generate an amplified version thereof, the first loop defined as a nonlinear amplifying loop mirror;
   a second loop of polarization maintaining normal, negative dispersion single mode fiber;
   a polarization maintaining directional coupler disposed between and coupled to both the first and second loops of polarization maintaining normal, negative dispersion fiber, the maintained polarization state of a propagating optical signal providing mode-locking thereof; and
   an external perturbation source coupled to one of the first and second loops to introduce a perturbation into the propagating signal and initiate passive mode locking.

* * * * *